United States Patent [19]

Abe

[11] Patent Number: 4,669,075
[45] Date of Patent: May 26, 1987

[54] OPTICAL DISK CONTROL APPARATUS

[75] Inventor: Minoru Abe, Fujisawa, Japan

[73] Assignee: Mitsubishi Denki Kabushiki Kaisha, Tokyo, Japan

[21] Appl. No.: 697,487

[22] Filed: Feb. 1, 1985

[30] Foreign Application Priority Data

Feb. 6, 1984 [JP] Japan ................................ 59-18476

[51] Int. Cl.$^4$ ............................................ G11B 20/18
[52] U.S. Cl. .................................... 369/48; 360/38.1;
358/336; 369/59; 369/124
[58] Field of Search ............... 360/38.1; 358/336, 314;
369/32, 59, 54, 58, 47, 48, 124

[56] References Cited

U.S. PATENT DOCUMENTS 4,409,627 10/1983 Eto ...................................... 360/38.1
4,523,304 6/1985 Satoh ................................... 358/336
4,535,439 8/1985 Satoh .................................... 369/32

FOREIGN PATENT DOCUMENTS 0081757 6/1983 European Pat. Off. .
0096885 12/1983 European Pat. Off. .
56-134308 10/1981 Japan .
58-23366 2/1983 Japan .

Primary Examiner—Alan Faber
Attorney, Agent, or Firm—Leydig, Voit & Mayer

[57] ABSTRACT

An optical disk control apparatus which makes it possible to record and play back the data of a sector when a sector signal representative of the start of the sector is missing. A timer detects an overtime in the time intervals between sector signals due to a missing sector signal due to a defect in an optical disk or the like. A one-shot circuit is provided to produce a simulation sector signal similar to the normal sector signals when an overtime is detected. A combining circuit is connected to receive either the normal sector signals or the simulation sector signals and delivers the signals to a control circuit so as to enable the control circuit to operate the apparatus continuously.

6 Claims, 2 Drawing Figures

OPTICAL DISK CONTROL APPARATUS

BACKGROUND OF THE INVENTION

This invention relates to an optical disk control apparatus which controls the recording and playback of the data of an optical disk, and more particularly to an optical disk control apparatus which uses signals recorded at the heads of sectors to indicate the starts of the respective sectors.

A conventional apparatus of the type described above is shown in FIG. 1. Referring to the figure, numeral 1 designates an optical disk device including an optical disk (not shown), and numeral 2 designates an optical disk control apparatus. Numeral 3 designates a sector signal obtained by reproducing a signal written at the head of each sector of the optical disk, numeral 4 designates a playback gate signal, numeral 5 designates a playback data signal, numeral 6 designates a recording gate signal, and numeral 7 designates a recording data signal. A control circuit 8 for the optical disk device 1 is included in the optical disk control apparatus 2.

In operation, the optical disk device 1 detects a signal written in a sector of the optical disk and delivers a sector signal 3 indicative of the start of the sector. The optical disk control apparatus 2 is triggered by the sector signal 3, and it sends a recording data signal 7 along with a recording gate signal 6 to the optical disk device 1 in the recording mode, and it sends a playback gate signal 4 to the optical disk device 1 and receives a playback data signal 5 therefrom in the playback mode.

Since the conventional optical disk control apparatus has been constructed and operated as described above, it has has the disadvantage that when the sector signal 3 cannot be reproduced due to a defect of the optical disk or other apparatus, the recording and playback of the corresponding sector are impossible.

SUMMARY OF THE INVENTION

This invention has been made in order to eliminate the disadvantage of the conventional apparatus as mentioned above, and has for its object to provide an optical disk control apparatus in which a simulation signal is produced in place of a sector signal which is judged to be missing from the preceding sector signal, thereby making it possible to record and play back the data of a sector of the missing sector signal.

PREFERRED EMBODIMENT OF THE INVENTION

Figure 1:
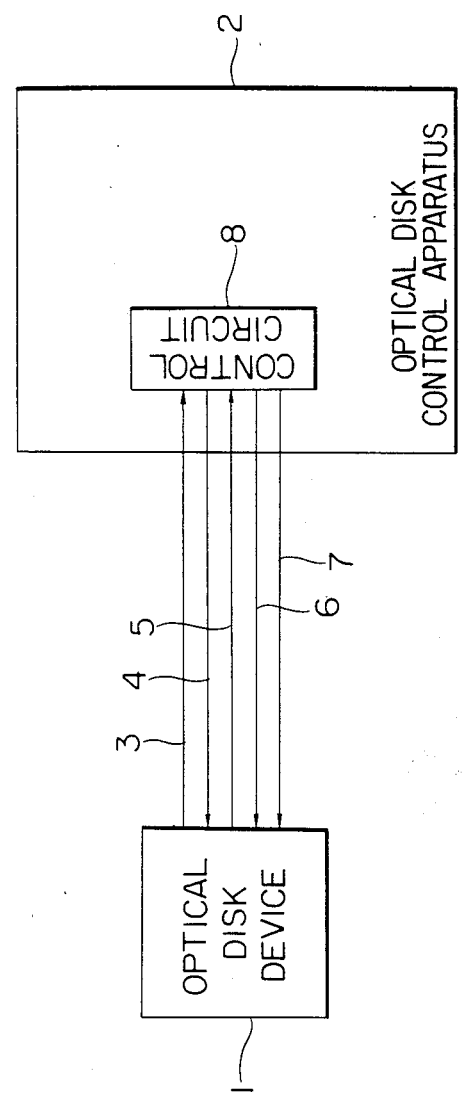
FIG. 1 is a block diagram of a conventional optical disk control apparatus.
Figure 2:
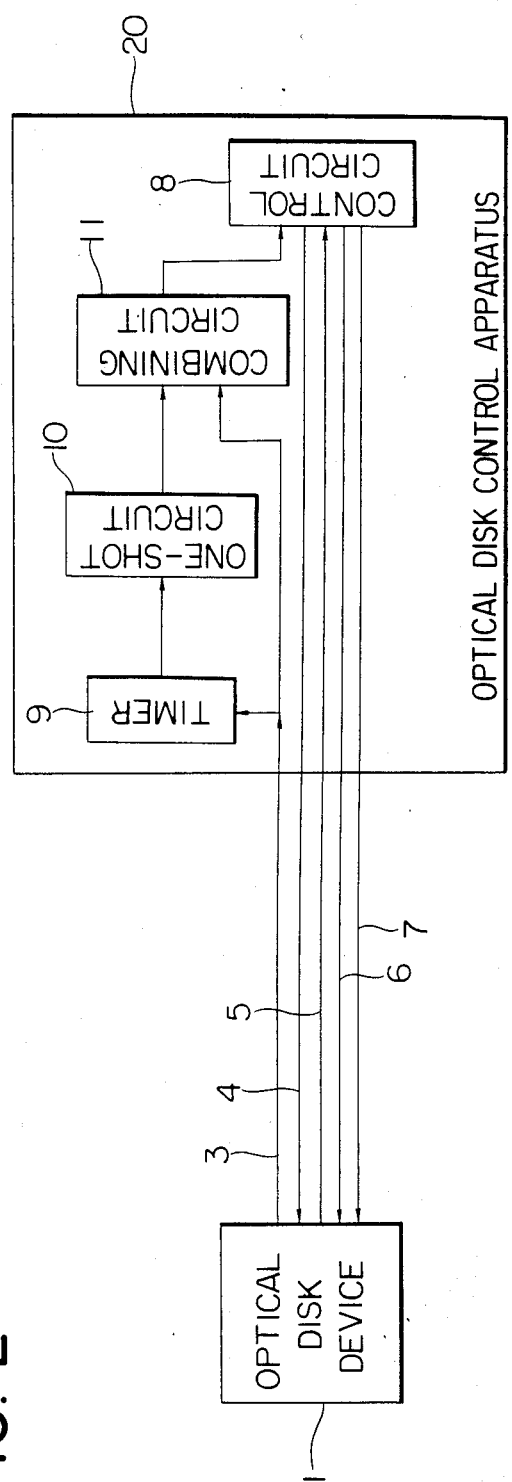
FIG. 2 is a block diagram showing an optical disk control apparatus according to one embodiment of this invention.

An embodiment of this invention is shown in FIG. 2, and will now be described. Referring to FIG. 2, numeral 20 designates an optical disk control apparatus. A timer 9 detects an overtime in the intervals between sector signals 3 due to the omission of a sector signal and produced an output representative thereof. Upon detection of this output signal, one-shot circuit 10 generates a simulation sector signal similar to the sector signal 3 generated from the optical disk device 1 under normal operating conditions. A combining circuit 11 is connected to receive, as imputs, the sector signals normally produced by the optical disk reader device and the simulation sector signals produced by the one-shot circuit 10 when a sector signal is missing. The other portions of the control apparatus according to the present invention are the same as in the conventional apparatus shown in FIG. 1, and their further explanation is deemed to be unnecessary.

Next, the operation of the apparatus will be described. In the arrangement of FIG. 2, under normal operating conditions the optical disk reader device 1 produces a sector signal 3 representative of the start of a sector and this sector signal is sent to the combining circuit 11. At the same time, the timer 9 monitors the sector signal 3 and takes no action since no omission of the sector signal 3 is detected. As a result, no simulation sector signal is produced by the one-shot circuit 10 and the combining circuit 11 simply receives the sector signal 3 and delivers it to the control circuit 8. When the sector signal 3 is omitted due to a defect of an optical disk (not shown), for example, the timer 9, which is monitoring an overtime in the time intervals between sector signals 3, detects the omission and triggers the one-shot circuit 10 then. The one-shot circuit 10 supplies the combining circuit 11 with a simulation sector signal similar to the sector signal 3, and the combining circuit 11 delivers it to the control circuit 8 so as to enable the control circuit 8 to operate.

In the embodiment, although the time interval with respect to the directly preceding sector signal has been monitored, similar effects are attained even when a time interval with respect to an even earlier sector signal is monitored.

As set forth above, according to this invention, when a sector signal is missing, a simulation sector signal is produced for delivery to the control circuit in place of the sector signal normally produced by the optical disk reader device so as to permit the recording and playback of the corresponding sector. This produces the effects that the recording density of an optical disk increases, and that the data of the sector which has become incapable of playback after the recording thereof can be played back.

It will be appreciated by one skilled in the art that this invention may be practiced or embodied in still other ways without limiting it to the embodiments as described and illustrated and without departing from the spirit or essential character thereof.

What is claimed is:

1. An optical disk apparatus for controlling recording and playback operations of an optical disk formed of sectors when sector signals representative of the start of said sectors and produced by an optical disk reader device are missing, said apparatus comprising:

a control circuit for operating said apparatus upon receiving sector signals recorded on the sectors, a timer connected to receive sector signals from the optical disk reader device including means for detecting an overtime in the time intervals between the sector signals due to the omission of a sector signal and producing an output representative thereof, and a one-shot circuit for generating a simulation sector signal responsive to the output from said timer indicating a missing sector signal for delivery to the control circuit in place of the sector signal normally produced by the optical disk reader device.

2. An optical disk control apparatus according to claim 1 wherein said timer detects an overtime with respect to the directly preceding sector signal.

3. An optical disk control apparatus according to claim 1 wherein said timer detects an overtime with respect to a sector signal which precedes the directly preceding sector signal.

4. An optical disk control apparatus according to claim 1 further including a combining circuit which normally receives the sector signal from the optical disk reader device and sends it to the control circuit and which, upon the generation of the simulation sector signal by said one-shot circuit, receives the simulation sector signal and sends it to the control circuit.

5. An optical disk control apparatus according to claim 4 wherein said timer detects an overtime with respect to the directly preceding sector signal.

6. An optical disk control apparatus according to claim 4 wherein said timer detects an overtime with respect to a sector signal which precedes the directly preceding sector signal.

* * * * *